United States Patent [19]

Kuechler et al.

[11] Patent Number: 5,360,848
[45] Date of Patent: Nov. 1, 1994

[54] MODIFIED BITUMENS, PROCESSES FOR THEIR PREPARATION, THEIR USE AND SOLUBILIZING AGENTS FOR PLASTICIZED POLYVINYL BUTYRAL IN BITUMEN

[75] Inventors: Manfred Kuechler, Oberursel; Bernd Mucha, Neu-Anspach, both of Germany

[73] Assignee: Hoechst Aktiengesellschaft AG, Germany

[21] Appl. No.: 101,994

[22] Filed: Aug. 4, 1993

[30] Foreign Application Priority Data

Aug. 6, 1992 [DE] Germany .................. 4226000

[51] Int. Cl.$^5$ ............................................. C08L 95/00
[52] U.S. Cl. ........................................................ 524/59
[58] Field of Search ..................... 524/59, 68, 71, 66, 524/62

[56] References Cited

U.S. PATENT DOCUMENTS 3,332,799  7/1967  Parker ................................. 524/66
4,235,953  11/1980  Kumins et al. ..................... 524/66

Primary Examiner—Peter Szekely
Attorney, Agent, or Firm—Bierman and Muserlian

[57] ABSTRACT

Modified bitumens, processes for their preparation, their use and solubilizing agents for plasticized polyvinyl butyral in bitumen.

Preparation of modified bitumens having improved elasticity properties and an improved low-temperature flexibility by homogeneous mixing of plasticized polyvinyl butyral (PVB) into molten bitumen at 150° to 300° C., simultaneously using mono-, oligo- or polyalkylene glycol dialkyl ethers as solubilizing agents, if appropriate in combination with polystyrene as solubilizing co-component. Process for the preparation of the modified bitumens and possible uses thereof in industrial fields in which bitumens elasticized by conventional methods have hitherto been employed or required.

11 Claims, No Drawings

MODIFIED BITUMENS, PROCESSES FOR THEIR PREPARATION, THEIR USE AND SOLUBILIZING AGENTS FOR PLASTICIZED POLYVINYL BUTYRAL IN BITUMEN

The invention relates to solubilizing agents for plasticized polyvinyl butyral (PVB) in bitumen for the preparation of homogeneous bituminous mixtures, dialkyl mono-, oligo- and polyalkyleneglycol ethers, if appropriate in combination with polystyrene, being used as the solubilizing agent and it being possible to obtain modified bitumen having improved elasticity properties and an improved low-temperature flexibility.

The production of elastic, waterproof roof sheeting from homogeneous mixtures of coal-tar pitch and plasticized polyvinyl butyral (PVB) is known from U.S. Pat. Nos. 4,264,674 and 4,277,533. For this, molten coal-tar pitch and up to 60% by weight, based on the resulting homogeneous mixture, of plasticized PVB are mixed at temperatures between 175° and 200° C. in a positive mixer without a solubilizing agent until they form a homogeneous liquid mass, which is then poured onto a rubber conveyor belt to form a cast film 1 mm thick, and the latter is cooled to room temperature and peeled off from the rubber substrate.

Attempts at analogous elasticizing modification of bitumen such as is obtained in large quantities during processing of crude oil and is used, inter alia, as a binder for the production of road construction materials have however remained unsuccessful, since plasticized PVB cannot be mixed homogeneously with molten bitumen, but merely forms heterogeneous, unusable mixtures with a high number of specks. Nor does the use of plasticizer-free PVB result in any usable homogeneous mixtures with bitumen. On the other hand, the thermoplastic and tough and resilient properties, the good resistance to UV light and the good resistance to oxidation of plasticized PVB still show this product as being of interest as an elasticizing component for bitumen, for which, inter alia, complete homogeneous miscibility with bitumen is necessary.

As is known, in accordance with DIN 55,946, the dark-colored, semi-solid to bounce-hard, fusible high molecular weight hydrocarbon mixtures obtained from the distillation residues from gentle distillative processing of crude oils and the constituents of naturally occurring asphalts or of mineral wax or of montan wax which are soluble in carbon disulfide are called bitumen.

These products have found various industrial uses, uses as binders in road construction materials and as an insulating material against aqueous media being by far the most important in terms of quantity. Of particular importance here are the so-called standard bitumen according to DIN 1995, with penetration values, for example, for so-called distillation bitumen of types B 15 to B 300° at 25° C. of 10 to 320 [1/10 mm] as the characteristic parameter, the penetration value with the dimension of [1/10 mm] being defined as the penetration depth of a standard needle under a load of 100 g into the bitumen after 15 seconds at a certain temperature, measured by means of a penetrometer, as the number of 1/10 mm penetration depth units [=penetration].

In addition to the penetration, the softening point of the bitumen in [°C.] is usually stated as a further parameter. This is the temperature determined, for example, by the ring and ball method (R & B), at which a standardized steel ball penetrates through a bitumen layer of standardized thickness. The abovementioned commercially available distillation bitumen types B 300 to B 15 accordingly have softening points in the range from 27° to 72° C. The distillation bitumen types preferably used have R & B softening points of preferably 35° to 75° C. and penetrations at 25° C. of preferably 10 to 210 [1/10 mm].

Harder and higher-melting bitumens can be obtained from softer distillation, extraction and cracking residue bitumen types by the action of atmospheric oxygen at about 200° to 260° C. by the so-called blowing process. As the blowing time increases, the penetration of the resulting so-called blown bitumen decreases and the softening point increases. The bitumen can also be characterized by stating the values for the R & B softening point and the penetration at 25° C. as the [R & B/Pen.]-value.

The commercially available blown bitumen types preferably used have R & B softening points of preferably 80° to 140° C. and a penetration at 25° C. of preferably 3 to 45 [1/10 mm].

To improve the elasticity and low-temperature breaking strength, as is known, elasticizing components are added to the bitumens for some fields of use. Thus, road construction bitumen often contains 10 to 20% by weight of a relatively expensive styrene/butadiene rubber (SBS rubber), and the use of polyalkyl (meth)acrylate as an additional component to improve the elastic resilience properties and the low-temperature flexibility of the bitumen is known from DE-OS 39 17 815.

The present invention was thus based on the object of discovering a solubilizing agent, which is preferably chemically inert and allows preparation of homogeneous mixtures of bitumen and plasticized polyvinyl butyrals, preferably from recycled grades of the latter, which form homogeneous phases free from specks both in the molten and in the solidified form and, in the solidified form, possibly have improved elasticity properties and improved low-temperature flexibilities compared with non-modified bitumen.

Such modified bitumens are of particular interest for uses as binders in road construction materials, as an insulating composition for the production of pipeline sheathings, and as casting compositions in electrical engineering, in the construction sector and in road and bridge construction.

It has now been found, surprisingly, that the object described can advantageously be achieved if mono-, oligo- or polyalkylene glycol dialkyl ethers, if appropriate in combination with polystyrene as a solubilizing co-component, are used as solubilizing agents.

Mono-, oligo- or polyalkylene glycol dialkyl ethers which are used are preferably compounds of the formula I or II,

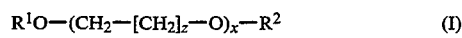

$$R^1O-(CH_2-[CH_2]_z-O)_x-R^2 \qquad (I)$$

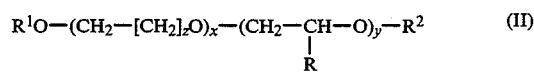

$$R^1O-(CH_2-[CH_2]_zO)_x-(CH_2-\underset{R}{CH}-O)_y-R^2 \qquad (II)$$

in which in each case $R^1$ and $R^2$, which can be identical or different and are preferably identical, are $(C_1-C_4)$-alkyl, preferably methyl or ethyl, R is methyl or ethyl, preferably methyl, x is in each case a number from 1 to 5000, preferably 3 to 2500, y is a number from 0 to 500, preferably 1 to 200, with the proviso that at y values of >0, the value of x is 0 or, preferably $\geq 4y$, and z is a number from 1 to 8, preferably 1 to 3, in particular 1, or mixtures of compounds of the formulae I and II, but preferably only compounds of the formula I. Compounds of the formula I where $z=1$ and $=3$ to 10, in particular $x=4$ to 8, are particularly preferred.

The mono-, oligo- and polyalkylene glycol dialkyl ethers used according to the invention as solubilizing agents are preferably water-miscible.

If $y > 0$, the compounds of the formula II can contain the various alkylene oxide units in random distribution or in blocks of uniform alkylene oxide units.

Preferred compounds of the formulae I and II are those having boiling ranges under normal pressure of >150° C., in particular $\geq 250°$ C., so that oligo- and polyalkylene glycol dialkyl ethers, in particular polyalkylene glycol dialkyl ethers of the formula I or II, are preferably used according to the invention as solubilizing agents. Preferred solubilizing agents are accordingly, for example, diethylene glycol dimethyl ether, triethylene glycol dimethyl ether, tetraethylene glycol dimethyl ether, polyethylene glycol dimethyl ethers of types 200, 250, 500, 1000 and 2000, in which the numbers 200 to 2000 in each case are the molecular weight of the polyethylene oxide diol units on which the dimethyl ethers are based, diethylene glycol dibutyl ether and polyethylene glycol/ propylene glycol $\alpha, \omega$-di-$(C_1-C_4)$alkyl ethers. Tetraethylene glycol dimethyl ether is particularly preferred.

Under the designation polystyrene, styrene homopolymers or styrene copolymers of in each case any desired macromolecular size, in the case of the latter with the proviso that the content of styrene and/or if appropriate of $\alpha$-methylstyrene monomer units in the copolymeric macromolecules is >70% by weight, based on the copolymer, are preferably used, if appropriate. Polystyrenes in solid form or dispersions or solutions thereof in a solubilizing agent of the formula I or II, or in particular in the form of solid homo- or copolymeric polystyrene foams, such as are usually used for packaging and insulation purposes, for example ®Styropor, or rigid polystyrene foams, such as are preferably used as water-insensitive insulating material in the construction sector, for example ®Styrodur or ®Roofmate, are preferred. Polystyrene foam grades which can be recycled, such as are obtained in large quantities from used packaging and insulating materials and from treated building rubble, are particularly preferred.

The simultaneous use of polystyrene as a solubilizing co-component together with solubilizing agents of the formula I or II is not absolutely necessary according to the invention. However, it is an advantageous and preferred optional variant of the present invention and leads to an unexpected synergistic increase in the solubilization between bitumen and plasticized PVB. On the other hand, very high polystyrene contents can lead to the advantageous elasticizing effect which can be achieved by homogeneous addition of plasticized PVB in the bitumen largely disappearing, and if polystyrene is used by itself in the amount required for solubilizing the plasticized PVB employed, the modified bitumen becomes so hard and brittle that it largely loses its advantageous use technology properties and becomes industrially useless. The preparation of such mixtures, which is possible per se, from bitumen and plasticized PVB using polystyrene by itself as the solubilizing agent furthermore requires relatively long and intensive mixing and kneading of the components in the bitumen melt in order to obtain a homogeneous mixed melt, from which an unelastic solid with hardness and brittleness characteristics depending on the composition then results when the melt is cooled to normal temperature. If solubilizing agents of the formula I or II according to the invention are used simultaneously with polystyrene as a solubilizing co-component, a significant shortening in the homogenization times before a homogeneous mixed melt of bitumen and plasticized PVB is formed can be achieved under comparable conditions, and moreover an improved solubilizing effect manifests itself, which can be seen, inter alia, from a possibly surprisingly lower amount used of the required solubilizing agent combination in which polystyrene participates, compared with the use of solubilizing agents of the formula I or II by themselves, with at least an equally good improvement in the elasticity properties and the low-temperature flexibility of the modified bitumen. The simultaneous use of polystyrene as a solubilizing co-component moreover leads to an intensified decrease in the viscosity of the modified bitumen melt and facilitates its processability.

The amount of solubilizing agent or solubilizing agent combination according to the invention employed in mixtures of bitumen and plasticized PVB is not critical and can be varied within wide limits, and the particular minimum amount required can easily be determined by simple trial and error. The amount employed is preferably 1 to 30% by weight, in particular 8 to 25% by weight, based on the total amount of the mixture of bitumen and plasticized PVB, solubilizing agents being understood as the mono-, oligo- or polyalkylene glycol dialkyl ethers of the formula I or II used or the sum of the components of mono-, oligo- and polyalkylene glycol diethyl ethers of the formula I or II used and of the co-component polystyrene. Bitumen and plasticized polyvinyl butyral (PVB) can be mixed homogeneously in the melt in any desired proportions by simultaneously using effective amounts of solubilizing agents according to the invention, preferably with intensive thorough mixing in a customary mixing device, for example a heatable kneader or a heatable planetary mixer having a powerful shearing force action, at temperatures in the range from preferably 150° to 300° C., in particular 200° to 260° C., particularly preferably at 250° C.

Preferably, plasticized PVB is added to the bitumen in amounts of 5 to 60% by weight, for example for use of the modified bitumen as a casting composition or sheathings for cable and steel pipes, particularly preferably 15 to 30% by weight, for example for use of the modified bitumen as a binder in road construction materials or in building materials for production of elastic flooring and insulating layers, in each case based on the total amount of bitumen and plasticized PVB, with additional simultaneous use of solubilizing agents according to the invention in the particular solubilizing amount required.

If solubilizing combinations of mono-, oligo- or polyalkylene glycol dialkyl ethers of the formula I or II and polystyrene, preferably polystyrene foam, are simultaneously used, the minimum solubilizing amount used and required when compounds of the formula I or II are used by themselves can be reduced considerably, since combinations of formula I or II compounds and polystyrene evidently can display a synergistic increase in solubilizing action and, in comparison with polystyrene-free mixtures, modified bitumen having particularly good elasticity and low-temperature flexibility properties can be obtained, and the simultaneous use of polystyrene moreover allows a shortening in the mixing or homogenization time required before homogeneous mixed melts, which furthermore have a more greatly reduced viscosity, are achieved.

The solubilizing combinations of compounds of the formula I or II and polystyrene or a styrene copolymer are preferably used according to the invention, where appropriate, in a weight ratio of formula I or II compound: polystyrene or styrene copolymer =99:1 to 1:1, in particular 3:1 to 1.5:1, and the use moreover can be adapted to any particular total amount requirement to be imposed, if required, on the combination.

Possible starting substances for the plasticized PVBs used according to the invention are all the known PVB types which can be prepared by known methods and can be plasticized with suitable customary plasticizers, for example by thermoplastic extrusion, and can be processed thermoplastically in the plasticized form to give industrially usable shaped articles, such as, for example, flat films, which can be used in particular, inter alia, as intermediate films for production of panes of multilayer laminated safety glass from inorganic panes of glass.

The polyvinyl butyrals preferably suitable for this purpose have a content of vinyl alcohol monomer units of preferably 15 to 29% by weight, in particular 18.5 to 24% by weight, particularly preferably 19 to 22% by weight, and if appropriate a content of vinyl acetate units of 1 to 4% by weight, in each case based on the PVB. The viscosity of the 5% strength by weight ethanolic solutions of the PVBs (measured in accordance with DIN 53015) at 23° C. is preferably 10 to 200 mPa.s, in particular 50 to 100 mPa.s.

Plasticized polyvinyl acetals which contain aliphatic acetal radicals having 1 to 3 or 5 to 8 carbon atoms or, if appropriate, radicals of benzaldehyde instead of some or all of the butyral radicals, if appropriate mixed with plasticized PVB, are also suitable. However, plasticized PVBs are particularly preferred.

Plasticizers which can be used are all the known plasticizers or plasticizer mixtures which are compatible with PVB and suitable for plasticizing the latter. A list of commercially available plasticizers which contains data on their compatibility with PVB can be found, for example, in the publication Modern Plastics Encyclopedia 981/1982, pages 710 to 719. Preferred plasticizers are, for example, diesters of aliphatic diols, in particular of aliphatic polyether-diols or polyether-polyols, with aliphatic carboxylic acids, preferably diesters of polyalkylene oxides, in particular diesters of di-, tri- and tetraethylene glycol with aliphatic ($C_6$-$C_{10}$)-carboxylic acids, preferably 2-ethylbutyric acid and n-heptanoic acid, and furthermore diesters of aliphatic or aromatic ($C_2$-$C_{18}$)-dicarboxylic acids, preferably adipic acid, sebacic acid and phthalic acid, with aliphatic ($C_4$-$C_{12}$)-alcohols, in particular dihexyl adipate. Particularly preferred plasticizers are furthermore, for example, dioctyl adipate, dihexyl phthalate, dibutyl phthalate, triethylene glycol di-fatty acid esters, tri- and tetraethylene glycol di-heptanoate and triethylene glycol di-(2-ethyl-butanoate).

The plasticizers are employed for plasticizing PVB in the customary amounts, which can preferably be in the range from 1 to 50% by weight, in particular 5 to 45% by weight, particularly preferably 10 to 30% by weight, based on the PVB/plasticizer mixture.

As is known, adequately plasticized PVB films which are suitable as films as intermediate layers for production of panes of laminated glass are preferably produced by means of thermoplastic extrusion through sheet dies to give flat films preferably 0.2 to 2 mm thick. The extrusion temperature of the plasticized and stabilized extrusion molding compositions is in the customary range, preferably between 140° and 250° C., short intervals at higher temperatures also being possible. Flat films can also be produced by thermoplastic shaping of stabilized plasticized PVB molding compositions on a heatable triple-roll mill or a calender. Plasticized commercially available PVB such as is used for production of films as interlayers for panes of multilayer laminated glass from inorganic panes of glass is preferred. This interlayer film material is particularly preferably in the form of inexpensive plasticized PVB shredded film from recycling processes for waste panes of laminated glass, in particular panes due for disposal from automobiles, which are processed in increasing amounts in specific shredder units and are separated into glass and plasticized PVB shredded film. The latter is outstandingly suitable in its recycling qualities as a blending material for the bitumen modification according to the invention, while it can no longer be used, for example, for production of new films for intermediate layers.

The invention therefore relates to modified bitumen having improved elasticity properties and an improved low-temperature flexibility, comprising bitumen and a polymeric elasticizing component in homogeneous distribution, which comprises, as the elasticizing component, plasticized polyvinyl butyral (PVB) and, as the solubilizing agent for the latter, an amount, sufficient for solubilization, of a compound of the formula I or II

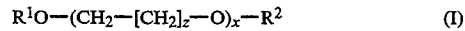

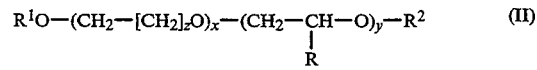

in which in each case $R^1$ and $R^2$, which can be identical or different and are preferably identical, are ($C_1$-$C_4$)-alkyl, preferably methyl or ethyl, R is methyl or ethyl, preferably methyl, x is in each case a number from 1 to 5000, preferably 3 to 2500, y is a number from 0 to 500, preferably 1 to 200, with the proviso that at y values of >0, the value of x is 0 or, preferably ≧4y, and z is a number from 1 to 8, preferably 1 to 3, in particular 1, or mixtures of compounds of the formulae I and II, if appropriate in combination with polystyrene or a styrene copolymer as the solubilizing co-component.

Compounds of the formula I are particularly preferred, preferably compounds of the formula I where z=1 and x=3 to 10, in particular x=4 to 8.

The content of plasticized PVB in the modified bitumen is preferably 5 to 60% by weight, in particular 15 to 30% by weight, based on the total amount of starting bitumen and plasticized PVB.

The content of solubilizing agents of the formula I or II or, if appropriate, combinations thereof with the solubilizing co-component polystyrene or styrene copolymer is preferably 1 to 30% by weight, in particular 8 to 25% by weight, based on the total amount of the mixture of starting bitumen and plasticized PVB.

Contents of solubilizing combinations of compounds of the formula I or II and of the synergistically solubilizing co-component polystyrene or styrene copolymer, preferably in a weight ratio of 99:1 to 1:1, in particular 3:1 to 1.5:1, are preferred.

The plasticizer content in the plasticized PVB preferably comprises ester-like plasticizers and is preferably in the range from 5 to 45% by weight, in particular 10 to 30% by weight, based on the PVB/plasticizer mixture.

The polyvinyl butyrals contained in the plasticized PVB have a content of vinyl alcohol monomer units of preferably 15 to 29% by weight, in particular 18.5 to 24% by weight, particularly preferably 19 to 22% by weight, and if appropriate a content of vinyl acetate monomer units of 1 to 4% by weight, in each case based on the PVB. The viscosity of the 5% strength by weight ethanolic solutions of the polyvinyl butyrals (measured in accordance with DIN 53015) at 23° C. is preferably 10 to 200 mPa.s, in particular 50 to 100 mPa.s.

Particularly preferred is plasticized PVB shredded film from plasticized PVB film material for interlayers for laminated glass, such as can be obtained to an increasing extent from recycling processes for panes of waste laminated glass, preferably from automobiles, in specific shredder units which are capable of separating the plasticized PVB film content practically completely from the glass constituents.

The starting bitumens on which the bitumens modified according to the invention are based are preferably commercially available distillation bitumens, in particular of types B 15 to B 300, having R & B softening points of preferably 35° to 75° C., and preferably commercially available blown bitumens having R & B softening points of preferably 80° to 140° C., or mixtures of the bitumen grades mentioned, or other comparable commercially available bitumen grades. The bitumens modified according to the invention are preferably prepared by intensive mixing and homogenization of the additional components in the molten starting bitumen at elevated temperatures. Homogeneous mixtures according to the invention which have a low fleck content or are free from flecks can preferably be produced in commercially available heatable positive mixers or kneaders, preferably those with planetary gearing and a powerful shearing force action. In a preferred variant of the process, the starting bitumen is initially introduced into the mixer, melted and heated to temperatures of preferably >150° C. up to 300° C., in particular 200 to 260° C., particularly preferably to 250° C. The intended proportion of plasticized PVB is added to the heated bitumen melt, with good thorough mixing, and the mixture is kneaded. The required amount of solubilizing agent is then added at the same temperature, and the mixture is subsequently kneaded until the mass becomes completely homogeneous, and is then brought to room temperature, during which it solidifies. After this operation, the resulting modified bitumen is directly suitable for use, and is considerably more elastic and of higher notched impact strength in its solid form and has an improved low-temperature flexibility, compared with the corresponding profile of properties of the particular non-modified starting bitumen. The improvement in the elasticity properties and the low-temperature flexibility of the modified bitumen increases, under comparable modification conditions, as the content of plasticized PVB increases.

Another preferred process variant comprises first preparing a mixture or a granulated blend of plasticized PVB and the solubilizing agent or the solubilizing agent combination and then introducing this blend into the heated starting bitumen melt at the mixing temperature stated, preferably in the range from 150° to 300° C., in particular 200° to 260° C., particularly preferably at 250° C., while stirring, and homogenizing the mixture by intensive mixing and kneading and subsequently allowing it to cool to room temperature or using it directly in the molten form.

If solubilizing agent combinations having contents of polystyrene as a co-component are used, the use of polystyrene foam or rigid polystyrene foam is preferred. The use of waste polystyrene foam grades which can be recycled, such as are obtained in large quantities from used packaging and insulating materials and from treated building rubble in industrialized countries, is particularly preferred.

The use of plasticized PVB, preferably from interlayer film material for panes of laminated glass, in particular in recycling material grade, preferably in the form of shredded film, is particularly preferred as the elasticizing component.

The invention therefore furthermore relates to a process for the preparation of modified bitumen having improved elasticity properties and an improved low-temperature flexibility and comprising bitumen, plasticized polyvinyl butyral (PVB) as the elasticizing component and, as a solubilizing agent, mono-, oligo- or polyalkylene glycol dialkyl ethers of the formula I or II specified above, if appropriate in combination with polystyrene or a styrene copolymer as a solubilizing co-component, in a homogeneous mixture, which comprises initially introducing the starting bitumen into a heatable mixing apparatus and heating it to a temperature in the range from 150° to 300° C., preferably 200° to 260° C., in particular to 25020 C., introducing plasticized PVB into the bitumen melt with good thorough mixing and kneading with a powerful shearing force action, subsequently adding the solubilizing agent and if appropriate the solubilizing co-component, homogenizing the mixture by further intensive kneading and thorough mixing at the same temperature, and allowing the homogeneous melt to cool to normal temperature or using it directly in the molten form.

A preferred variant of this process comprises adding a granulated blend comprising plasticized PVB, the solubilizing agent and if appropriate the solubilizing co-component to the starting bitumen melt, which has been initially introduced into the mixer, at the above-mentioned temperature, and homogenizing the mixture by intensive kneading and thorough mixing with a powerful shearing force action at the same temperature, and allowing the homogeneous melt to cool to normal temperature or using it directly in the molten form.

The amount of plasticized PVB employed is preferably 5 to 60% by weight, in particular 15 to 30% by weight, based on the total amount of starting bitumen and plasticized PVB.

The amount of solubilizing agent employed or combinations thereof with the solubilizing co-component is preferably 1 to 30% by weight, in particular 8 to 25% by weight, based on the total amount of the mixture of starting bitumen and plasticized PVB.

The weight ratio of solubilizing agent and solubilizing co-component is preferably 99:1 to 1:1, in particular 3:1 to 1.5:1.

Commercially available distillation bitumen or commercially available blown bitumen or mixtures of these bitumens or other comparable commercially available bitumen grades are preferably employed as the starting bitumen.

Plasticized commercially available PVB or plasticized PVB from panes of laminated glass, preferably of recycling grade, is preferably employed as the plasticized PVB. The content of plasticizer in the plasticized PVB is preferably 5 to 45% by weight, in particular 10 to 30% by weight. The plasticizer content preferably comprises customary PVB plasticizers which contain ester groups.

Tetraethylene glycol dimethyl ether is preferably employed as the solubilizing agent and polystyrene foam, in particular waste polystyrene foam which can be recycled, is preferably employed as the solubilizing co-component.

The modified bitumens prepared according to the invention have significantly improved elasticity properties and significantly improved low-temperature flexibilities compared with the starting bitumens used. The bitumens modified according to the invention can be used, in particular, in all industrial fields where bitumens elasticized by conventional methods were hitherto employed or required. Preferred fields of use are, for example, the preparation of road construction material, preferably in combination with crushed rock, stone chips, pebbles, sand, rock dust and slag, and furthermore the preparation of compressed asphalt, asphalt concrete and rolled asphalt for road surfaces, casting compositions for expansion joints of concrete roads and concrete buildings, casting compositions for electrical engineering, insulating compositions for sheathings for steel and concrete pipes and pipelines, anti-noise compositions for vehicles and machinery, protection from stone chips and underbody protection for vehicle bodies, damp-proofing, roof sealing, insulating waterproof sheeting, roofing felts and the like.

The invention is illustrated in more detail by the following examples.

EXAMPLE 1

160 g of commercially available blown bitumen (manufacturer: Shell AG) having an R & B softening point of 100° C. and a penetration at 25° C. of 25 [1/10 mm] are initially introduced into a kneader apparatus which is heated by liquid and has planetary gearing and a powerful shearing force action, and are heated to 250° C. 100 g of plasticized PVB shredded film of recycling grade from panes of laminated glass are then added in portions to the bitumen melt at 250° C., with the kneading tools constantly running, and the mixture is kneaded intensively for 20 minutes, whereupon a heterogeneous melt is obtained. 10 g of tetraethylene glycol dimethyl ether are then added to the heterogeneous melt as a solubilizing agent and the mixture is kneaded at 250° C. for a further 20 minutes to give a homogeneous product melt which is free from specks, solidifies to a homogeneous speck-free solid on cooling to normal temperature and is an advantageously modified bitumen grade which, in contrast to the splintering blown bitumen employed as starting material, does not break or splinter at −18° C. in a manual impact test using a hammer weighing 300 g (5 successive blows of the ammer on the bitumen test specimen lying on a metal sheet) but shows a high elasticity, toughness and low-temperature flexibility, which opens up interesting possible uses for the product.

EXAMPLE 2

Example 1 is repeated, with the modification that instead of the blown bitumen, the same amount of commercially available distillation bitumen, type B 200 (manufacturer: Shell AG) having an R & B softening point of 40° C. and a penetration at 25° C. of 200 [1/10 mm] is used. Otherwise, the procedure is analogous to that described in Example 1. A homogeneous product melt which is free from specks, solidifies to a homogeneous and speck-free solid on cooling to normal temperature and an advantageously modified bitumen grade is obtained. In the manual impact test using a hammer at −18° C., the product neither breaks nor splinters, in contrast to the splintering starting distillation bitumen used.

EXAMPLE 3

Example 1 is repeated, with the modification that in addition to the solubilizing agent used therein, 12 g of polystyrene foam (recycling grade Styropor from packaging materials) are also added to the melt together with the latter as a solubilizing co-component, with the result that the homogeneity in the melt already occurs after a significantly shorter kneading time and the resulting homogeneous melt which is free from specks furthermore has a considerably lower viscosity than the melt of Example 1, which favors preparation and processing of the resulting modified bitumen. In the manual impact test using a hammer at −18° C., the resulting modified solid bitumen neither fractures nor splinters, compared with the non-modified splintering starting bitumen employed.

EXAMPLE 4

Example 1 is repeated, with the modification that instead of 10 g, only 5 g of tetraethylene glycol dimethyl ether are added as the solubilizing agent and 12 g of polystyrene foam (recycling grade Styropor from packaging materials) are additionally added as a solubilizing co-component, with the result that the homogeneity in the melt already occurs after a shorter kneading time than in Example 1 and the resulting homogeneous melt which is free from specks furthermore has a lower viscosity than the melt of Example 1, which favors preparation and processing of the resulting modified bitumen. In the manual impact test using a hammer at −18° C., the resulting modified solid bitumen neither fractures nor splinters, compared with the non-modified splintering starting blown bitumen employed.

EXAMPLE 5

Example 1 is repeated, with the modification that instead of 10 g, only 5 g of tetraethylene glycol dimethyl ether are added as the solubilizing agent and no additional polystyrene foam co-component is added. At the end of the experiment, a bitumen grade is likewise obtained which is advantageously modified but not completely free from specks and has advantageous elasticity features (for example manual hammer impact test at −18° C. without breaking, compared with the non-modified splintering starting bitumen).

We claim:

1. A modified bitumen having improved elasticity properties and an improved low-temperature flexibility, comprising bitumen and a polymeric elasticizing component in homogeneous distribution, which comprises, as the elasticizing component, plasticized polyvinyl butyral (PVB) and, as the solubilizing agent for the latter, an amount, sufficient for solubilization, of a compound of the formula I or II $$R^1O-(CH_2-[CH_2]_z-O)_x-R^2 \quad \text{(I)}$$

$$R^1O-(CH_2-[CH_2]_zO)_x-(CH_2-\underset{R}{\underset{|}{CH}}-O)_y-R^2 \quad \text{(II)}$$

in which in each case $R^1$ and $R^2$, which can be identical or different, are $(C_1-C_4)$-alkyl, R is methyl or ethyl, x is in each case a number from 1 to 5000, y is a number from 0 to 500, with the proviso that at y values of >0, the value of x is 0 or $\geq 4y$, and z is a number from 1 to 8, or mixtures of compounds of the formulae I and II, optionally in combination with polystyrene or a styrene copolymer as the solubilizing co-component.

2. A modified bitumen as claimed in claim 1, wherein the content of plasticized PVB is 5 to 60% by weight, based on the total amount of starting bitumen and plasticized PVB.

3. A modified bitumen as claimed in claim 1, wherein the plasticizer content in the plasticized PVB comprises ester plasticizers and is in the range from 5 to 45% by weight, based on the PVB/plasticizer mixture.

4. A modified bitumen as claimed in claim 1, wherein the polyvinyl butyral contained in the plasticized PVB has a content of vinyl alcohol monomer units of 15 to 29% by weight, and optionally a content of vinyl acetate monomer units of 1 to 4% by weight, in each case based on the PVB, and the viscosity of the 5% strength by weight ethanolic solution of the polyvinyl butyral (measured in accordance with DIN 53015) at 23° C. is 10 to 200 mPa.s.

5. A modified bitumen as claimed in claim 1, which comprises, as the plasticized PVB, plasticized PVB film material used as an interlayer for laminated glass and obtained from recycling processes from waste panes of laminated glass.

6. A modified bitumen as claimed in claim 1, which comprises, as the starting bitumen, commercially available distillation bitumen having an ring and ball softening point of 35° to 75° C., or commercially available blown bitumen having an ring and ball softening point of 80° to 140° C., or a mixture of the bitumen grades mentioned, or another comparable commercially available bitumen grade.

7. A modified bitumen as claimed in claim 1, wherein its content of solubilizing agent of the formula I or II or, optionally, a combination thereof with the solubilizing co-component polystyrene or a styrene copolymer is 1 to 30% by weight, based on the total amount of the mixture of starting bitumen and plasticized PVB.

8. A modified bitumen as claimed in claim 1, in which its content of solubilizing combination of compounds of the formula I or II and the synergistic solubilizing co-component polystyrene or a styrene copolymer is present in a weight ratio of 99:1 to 1:1.

9. A modified bitumen as claimed in claim 1, which comprises, as the solubilizing agent, a compound of the formula I in which, in formula I, $z=1$ and $x=3$ to 10.

10. A process for the preparation of modified bitumen having improved elasticity properties and an improved low-temperature flexibility as claimed in Claim 1, comprising bitumen, plasticized polyvinyl butyral (PVB) as the elasticizing component and, as the solubilizing agent, mono-, oligo- or polyalkylene glycol dialkyl ethers of the formula I or II, optionally in combination with polystyrene or a styrene copolymer as a solubilizing co-component, in a homogeneous mixture, which comprises initially introducing the starting bitumen into a heatable mixing apparatus and heating it to a temperature in the range from 150° to 300° C., introducing plasticized PVB into the bitumen melt with thorough mixing and kneading with a strong shearing force action, subsequently adding the solubilizing agent and optionally the solubilizing co-component, homogenizing the mixture by further intensive kneading and thorough mixing at the same temperature, and allowing the homogeneous melt to cool room temperature or using it directly in the molten form.

11. A road construction material containing crushed rock, stone chips, pebbles, sand, rock material or slag for the production of compressed asphalt, asphalt concrete and rolled asphalt for road surfaces, casting compositions for buildings, casting compositions for electrical engineering, insulating compositions for sheathings for steel and concrete pipes and pipelines, anti-noise compositions for vehicles and machinery, protection from stone chips and underbody protection for vehicle bodies, damp-proofing, roof sealing, insulating waterproof sheeting and roofing felts and a modified bitumen of claim 1 having improved elasticity properties and low temperature flexibility.

* * * * *